Sept. 11, 1923. 1,467,581
J. H. LABOURDETTE
TRAILER FOR AUTOMOBILE VEHICLES
Filed June 17, 1920 2 Sheets-Sheet 1
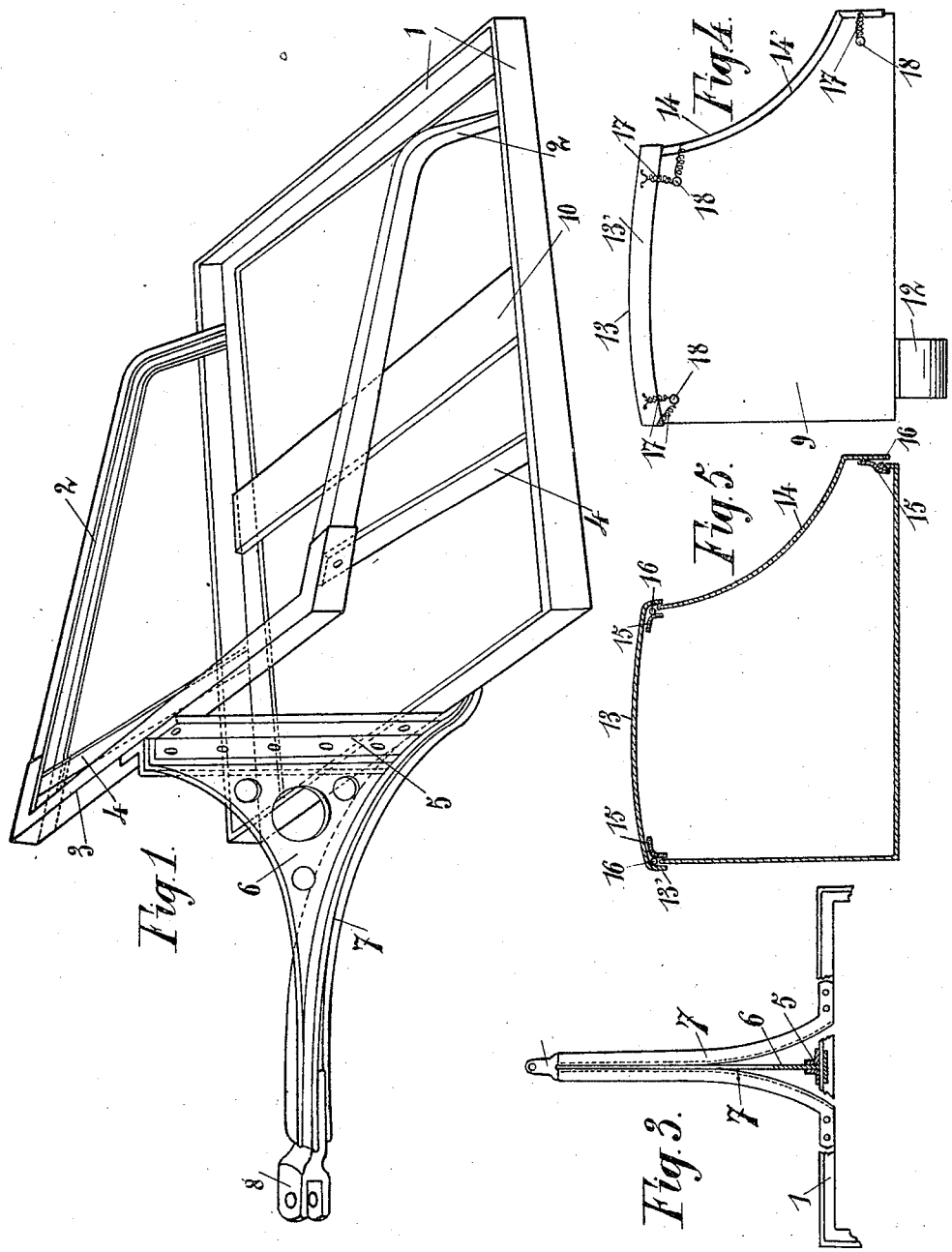
Inventor:
Jean Henri Labourdette
By
Rosenbaum Stockridge & Borsh
Attys Sept. 11, 1923.
J. H. LABOURDETTE
TRAILER FOR AUTOMOBILE VEHICLES
Filed June 17, 1920
1,467,581
2 Sheets-Sheet 2
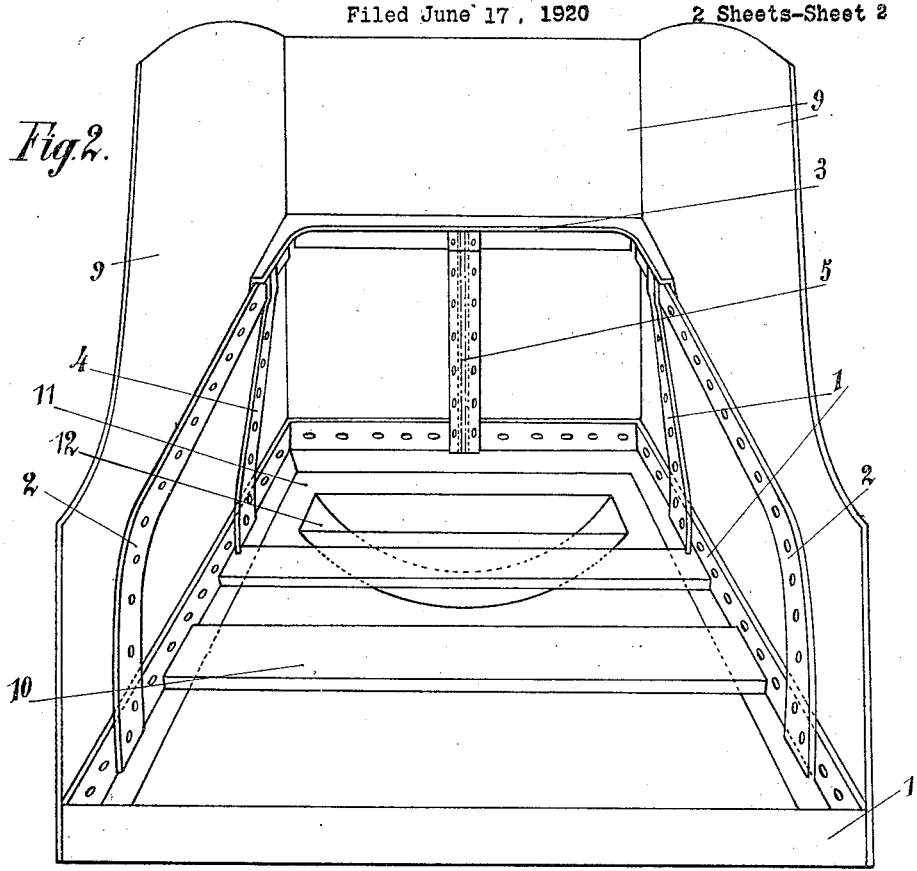
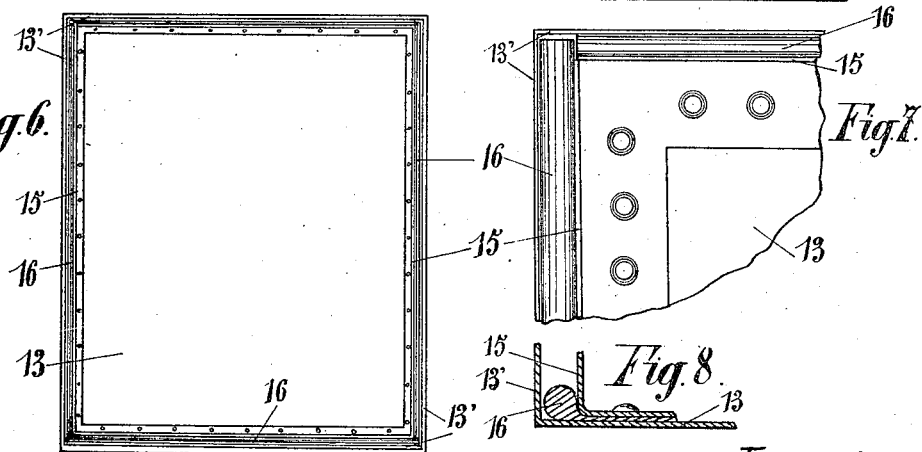

Patented Sept. 11, 1923.

1,467,581

UNITED STATES PATENT OFFICE.

JEAN HENRI LABOURDETTE, OF COURBEVOIE, FRANCE.

TRAILER FOR AUTOMOBILE VEHICLES.

Application filed June 17, 1920. Serial No. 389,645.

*To all whom it may concern:*

Be it known that I, JEAN HENRI LABOURDETTE, citizen of the French Republic, residing at Courbevoie, 68 Boulevard de Verdin, in the Department of Seine and State of France, have invented certain new and useful Improvements in Trailers for Automobile Vehicles, of which the following is a specification.

The present invention deals with trailers for automobile vehicles and more especially with trailers or "trailerettes" for private use intended to be attached to private automobiles, touring cars, auto-taxis, etc.

This invention consists essentially in the arrangements and the constructive means employed both in the combination of the said means and arrangements, and in the gathering together of the constituent parts and details for the production of a light trailer, easily handled, solid, of a small net cost, and of a general appearance harmonizing and in no case incongruous with the general appearance of private automobiles to which the said trailer is intended to be attached; this invention having no reference to the wheels and their method of suspension which can be of any nature whatever.

By way of illustration of the carrying out of the invention, one form of executing it comprising several variations in details is depicted in the drawings appended to this specification, and hereafter described.

In the drawings:—

Fig. 1 is a side perspective of the frame of the structure showing the arrangement, the construction and the combination of the chassis, the equipment and the coupling bar.

Fig. 2 is a rear perspective of the same showing the body adjusted on the frame and the curved portion of the bottom which may be used for carrying tires or spare wheels.

Fig. 3 is a view in bottom plan of the front of the chassis showing the arrangement of the constituent parts of the coupling pole.

Fig. 4 is a side elevation of the body showing the arrangement and the assemblage of the removable covers, and in combination as well as the method of fixing them to the said body.

Fig. 5 is a similar view in longitudinal section showing the method of assembling the covers as well as the means to prevent any rattling and noise from the said covers.

Fig. 6 is a view in plan of the under side of the top cover.

Fig. 7 is an enlarged view of one of the corners of this cover showing the detail of construction.

Fig. 8 being a sectional elevation of a portion of an edge of the cover.

From these figures it is seen that the structure of the trailer is constituted by the combination:—

1st. Of a chassis 1, formed of angle irons assembled by the means now employed, the corners being, if required, strengthened by gussets or square brackets.

2nd. Of an iron framework forming an inclined U in angle iron or flat iron, of which the ends of the branches 2, which can be straight or arched are riveted toward the rear part of the lateral bars of the chassis 1, the central part or head 3, of this incline which can be straight or arched corresponding to the front bar of the chassis 1 being placed at a certain distance above the said bar, the position and rigidity of this construction being insured by means of cross-pieces 4 in angle or flat iron, straight or arched in shape, which present the peculiarity of not having connected to them the front angular or rounded points of the chassis 1 and those of the incline formed by the branches 2, and the head 3, the object of which peculiarity will be afterwards explained.

3rd. Of a cross-piece 5 connecting at their middle points the front bar of the chassis 1 and the head 3 of the incline, this cross-piece forming a brace consisting of two angle irons coupled together and riveted by one of their wings, forming a T support, between them. A plate 6 shaped and perforated as may be desired is riveted to them forming a vertical gusset with the lower edge simultaneously grasped between two other angle irons, arched and forming what would be properly called the coupling bar 7, the rear ends of these angle irons abutting in any appropriate fashion on the front bar of the chassis 1, to which they are fixed by rivets or otherwise. The front ends of these angle irons of the coupling bar 7, are secured to the head 8, by which the trailer may be coupled to the rear of an automobile which draws it. The arched form of the coupling bar has for its object the compensation of difference of elevation between the chassis of the tractor vehicle and that of the trailer which is kept as low as possible with the object of facilitating its loading and lowering of its centre of gravity to render it more stable. The structure thus formed receives the body which is made up of a plate encompassing the chassis 1, on three of its sides, allowing free access from behind. The fixing of this plate 9 on the said structure is effected as by rivets to the front and lateral bars of the chassis 1, the branches 2, and the head 3 of the incline and the cross pieces 4. By the peculiar arrangement of the cross-pieces 4, the front corners of the body 9 are not strengthened thus ensuring when the said corners of the plate 9 are deformed in consequence of shock the integrity of the structure which as a consequence of this suffers no deformation.
The upper edge of the body 9 is shaped to the profile desired, the combination of the structure and the body 9 giving to the trailer a certain elegance of lines which recalls in some degree the ancient Roman war chariots.
The bottom is formed by one plate, or if preferred by planks 10, resting transversely on the wings of the lateral bars of the chassis 1, this bottom being capable of carrying in combination with the front part in substitution for and in place of one or two of the planks 10, a plate 11 with a receptacle 12, to take tires or spare wheels for the trailer or the tractor vehicle. In the same way in the back part of the bottom there can be mounted a similar receptacle for tools.

The body 9 in its upper and back part is closed in by a cover or by a combination of two or several covers joined together, which offers the advantage according to the cumbrous nature of the objects loaded in the trailer of partially closing it by the aid of one or more of the covers: if required in certain cases when it is impossible to set in position the whole or certain of these covers, a hood will be able to cover the body 9.

The arrangement of covers adopted in preference, consists in the union of an upper cover 13, and a rear cover 14 each one conforming to the configuration of the part of the body which it is required to close in. These covers in sheet iron, wood, etc., have outside edges 13' and 14' in pressed sheet iron or in moulded wood which ensures the maintennace of their position and at the same time prevents water entering into the interior of the trailer.

To make the setting in position of these covers more efficacious, as also to avoid the noise due to shaking, the inner circuit of the edges 13' and 14' of the covers 13 and 14 is formed double with an inner frame 15 forming together with the said edges a kind of groove at the bottom of and all round which is placed a cushion 16 consisting of a tube of rubber or any other material adapted to deaden sound.

This inner frame work can be made of light angle irons riveted to the covers as is shown in Fig. 6 and in detail in Figs. 7 and 8.

When the said covers are set in position the groove formed by the edges 13' and 14' and their inner framework 15 slightly overlap the edges of the body 9, which fit in, supporting themselves against the cushions 16 which deaden the shocks of shaking and by this means suppress all noise.

The assembly cover 13 with the cover 14 is effected in the same way, the upper edge of the cover 14, fits into the groove of the rear edge of the cover 13 which ensures that at this juncture the joint remains watertight.

The closing or the correlation of the whole or of some only of the covers is effected by means of hooks, belts, swivels, catches, etc., arranged in any number and in any way that may be appropriate.

For example one might use the system of attachment by springs and hooks 17, utilized for securing the covers to the body, these fastenings being kept at fixed points 18 arranged on the body 9. It is obvious that modifications in the details and improvements can be employed without departing from the sprit of the invention. For example in the case of certain cumbersome baggage the back cover 14 instead of being concave can be replaced by another exchange cover, convex or adopting a form which gives a symmetrical appearance to the body which will then be a regular prismatic solid with six faces—e. g. cubical.

What I claim is:

1. A trailer for attachment to the rear of vehicles, comprising a chassis frame, an auxiliary U-shaped frame having the free ends of its arms connected to the chassis frame adjacent the rear end of the latter and having its cross arm disposed above and in spaced relation to the forward end of the chassis frame, coupling means rigidly connecting the forward ends of the frames and having an extension by which the trailer may be coupled to a vehicle, and a casing carried by said frames.

2. A trailer for attachment to the rear of vehicles, comprising a chassis frame, an auxiliary U-shaped frame having the free ends of its arms connected to the chassis frame adjacent the rear end of the latter and having its cross arm disposed above and in spaced relation to the forward end of the chassis frame, a coupling member rigidly connecting the forward ends of the frames, extension means secured to the chassis frame to extend forwardly thereof, a plate connected to both the coupling member and the extension means, a coupling element carried at the forward end of said extension means, and a casing carried by the frames.

3. A trailer for attachment to the rear of vehicles, comprising a chassis frame, an auxiliary U-shaped frame having the free ends of its arms connected to the chassis frame adjacent the rear end of the latter and having its cross arm disposed above and in spaced relation to the forward end of the chassis frame, braces connecting the frames at points intermediate of their sides, means rigidly connecting the intermediate portions of the forward ends of the frames, and a forward extension on said chassis frame having a connection with said last named means by which the frames may be coupled to a vehicle.

4. A trailer for attachment to the rear of vehicles comprising a chassis frame, a U-shaped auxiliary frame having the free ends of its arms secured to the intermediate side portions of the chassis frame and its cross arm disposed above and spaced from the forward end of the chassis frame, a tongue element rigidly connecting the forward ends of the frames, extending forwardly therefrom and having provision for attachment to a vehicle.

5. A trailer for attachment to the rear of vehicles comprising a chassis frame, a U-shaped auxiliary frame having the free ends of its arms secured to the intermediate side portions of the chassis frame and its cross arm disposed above and spaced from the forward end of the chassis frame, a tongue element rigidly connecting the intermediate portions of the forward ends of the frames, extending forwardly therefrom and having provision for attachment to a vehicle, and strips connecting the intermediate side portions of the frames.

6. A trailer for attachment to the rear of vehicles comprising a chassis frame, a U-shaped auxiliary frame having the free ends of its arms secured to the intermediate side portions of the chassis frame and its cross arm disposed above and spaced from the forward end of the chassis frame, angle members secured to the intermediate portions of the forward ends of the frames to rigidly connect them, angle members secured to the chassis frame and extending forwardly with abutting faces, a gusset plate clamped between the faces of both sets of angle members, said plate and second mentioned angle members forming a tongue by which the trailer may be attached to a vehicle.

7. A vehicle body comprising a body portion having upwardly extending side edges at different levels, a cover element having channels on its lower and side portions for receiving the lower edges of the body portion, a second cover element having channels for receiving the upper edge of the first cover element and the remaining side edges, and resilient means in said channels for avoiding rattling sounds of the cover element upon the body portion.

8. A vehicle body comprising a body portion having upwardly extending side edges at different levels, a cover element having channels on its lower and side portions for receiving the lower edges of the body portion, a second cover element having channels for receiving the upper edge of the first cover element and the remaining side edges, and means for clamping the cover elements to the body portion.

9. A vehicle body comprising a body portion having upwardly extending side edges at different levels, a cover element having channels on its lower and side portions for receiving the lower edges of the body portion, a second cover element having channels for receiving the upper edge of the first cover element and the remaining side edges, resilient means in said channels for avoiding rattling sounds of the cover element upon the body portion and means for clamping the cover elements to the body portion.

In testimony whereof I affix my signature in presence of two witnesses.

JEAN HENRI LABOURDETTE.

Witnesses:
 GÄINS DANZER,
 LUCIEU CRESPIN.